United States Patent
Hiner et al.

(10) Patent No.: US 7,629,527 B2
(45) Date of Patent: Dec. 8, 2009

(54) MACHINE AND METHOD FOR TEACHING MUSIC AND PIANO

(76) Inventors: Hellene Hiner, 15131 New Hastings, Houston, TX (US) 77095; Valeri Koukhtiev, 15131 New Hastings, Houston, TX (US) 77095

(*) Notice: Subject to any disclaimer, the term of this patent is extended or adjusted under 35 U.S.C. 154(b) by 96 days.

(21) Appl. No.: 10/384,965

(22) Filed: Mar. 10, 2003

(65) Prior Publication Data

US 2003/0167902 A1  Sep. 11, 2003

Related U.S. Application Data

(60) Provisional application No. 60/363,451, filed on Mar. 11, 2002.

(51) Int. Cl.
*G09B 15/00* (2006.01)
*G09B 15/02* (2006.01)
*G09B 15/04* (2006.01)

(52) U.S. Cl. .............. 84/470 R; 84/471 R; 84/477 R; 84/478

(58) Field of Classification Search ........... 84/600, 84/470 R, 477 R, 478, 471 R, 479 A, DIG. 6
See application file for complete search history.

(56) References Cited

U.S. PATENT DOCUMENTS

| | | | | |
|---|---|---|---|---|
| 1,833,204 A | * | 11/1931 | Buxton | 84/472 |
| 4,089,246 A | * | 5/1978 | Kooker | 84/470 R |
| 5,493,179 A | * | 2/1996 | Tanizoe | 315/8 |
| 5,524,522 A | * | 6/1996 | Hesnan | 84/473 |
| 5,533,903 A | * | 7/1996 | Kennedy | 434/307 R |
| 5,639,977 A | * | 6/1997 | Hesnan | 84/477 R |
| 5,746,605 A | * | 5/1998 | Kennedy | 434/307 R |
| 5,886,273 A | * | 3/1999 | Haruyama | 84/478 |
| 6,057,501 A | * | 5/2000 | Hale | 84/470 R |
| 6,066,791 A | * | 5/2000 | Renard et al. | 84/477 R |
| 6,124,540 A | * | 9/2000 | Lotito | 84/483.2 |
| 6,127,616 A | * | 10/2000 | Yu | 84/483.2 |
| 6,331,668 B1 | * | 12/2001 | Michero | 84/477 R |
| 6,337,434 B2 | * | 1/2002 | Oren-Chazon | 84/478 |
| 2001/0039869 A1 | * | 11/2001 | Oren-Chazon | 84/1 |
| 2002/0050206 A1 | * | 5/2002 | MacCutcheon | 84/477 R |
| 2004/0173082 A1 | * | 9/2004 | Bancroft et al. | 84/612 |
| 2004/0206225 A1 | * | 10/2004 | Wedel | 84/477 R |

FOREIGN PATENT DOCUMENTS

FR  2643490  * 8/1990
FR  2643490 A1 * 8/1990

* cited by examiner

*Primary Examiner*—Marton T Fletcher
(74) *Attorney, Agent, or Firm*—Mark R. Wisner

(57) ABSTRACT

A method and system of teaching music that uses modified representations of the musical score, an interactive visual feedback describing the musical tones played on a musical device, and the marking of piano keys or other control instrumentalities of a musical device. This system helps students to recognize musical notes and piano keys, and to associate each note with the correct piano key. The modification of the musical score includes a vertical presentation of the musical staves, different colors of the staff lines for different staves, pictographs denoting the sol-fa names of the musical notes, and different representations of the musical notes on or between the staff lines. The marking of piano keys includes the application of colorful labels to distinguish the piano keys and associate them with musical notes and staves. A gradual transformation of the music score back to the standard music representation teaches students to read the standard music notation.

8 Claims, 10 Drawing Sheets

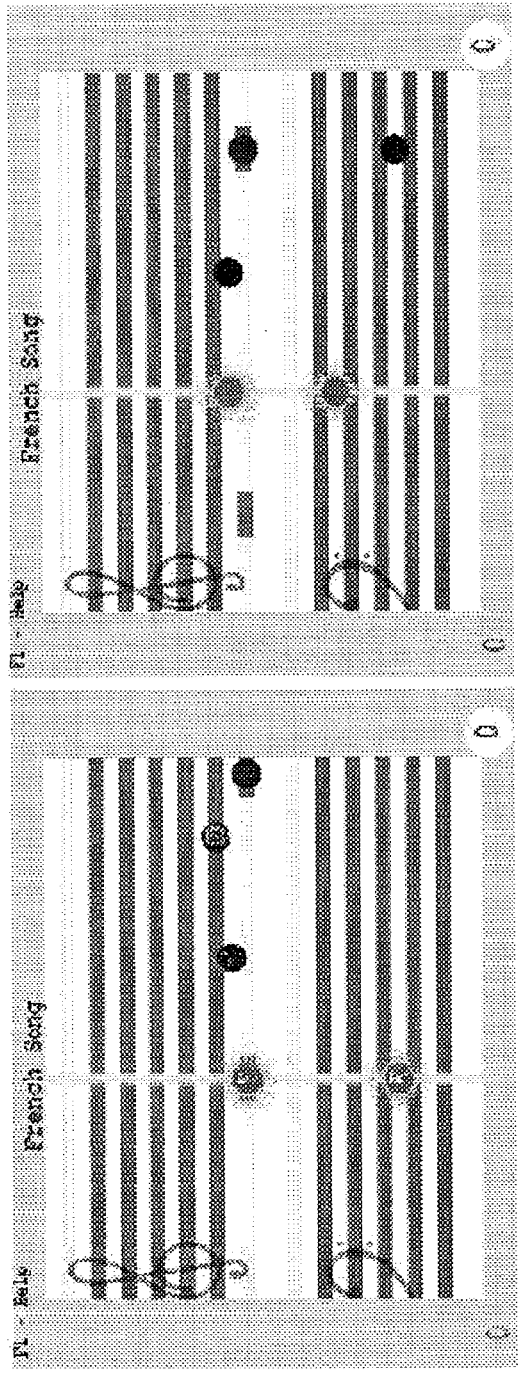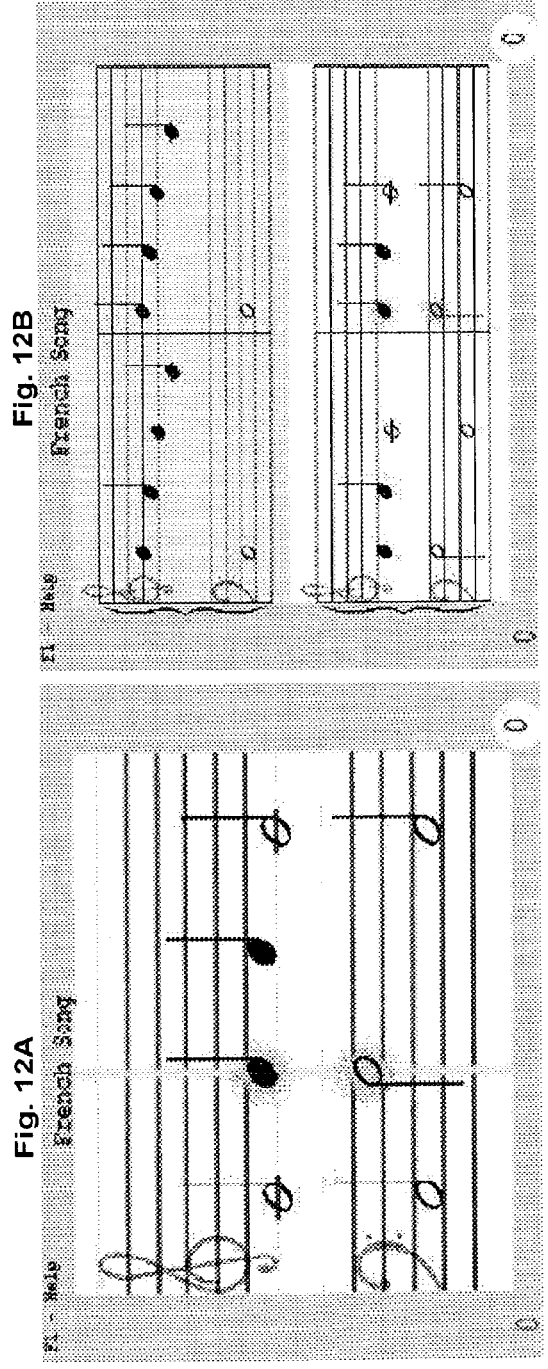
Fig. 12A  Fig. 12B  Fig. 12C  Fig. 12D

MACHINE AND METHOD FOR TEACHING MUSIC AND PIANO

CROSS REFERENCE TO RELATED APPLICATIONS

This application is based on U.S. provisional application Ser. No. 60/363,451, filed on Mar. 11, 2002.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of music and more specifically to a machine and method for teaching music and piano.

The learning of music in a systematic approach has been the goal of music teachers for centuries. The typical method of teaching music involved hours of rote learning of notes and their proper location on the Bass and Trebles staffs accompanied by hours of repetition with the particular musical instrument. The piano has often been the instrument of choice as it is capable of playing a tremendous variety of music from the most simple melody to complex symphonic composition. Written methods for teaching the piano abound and largely rely on repeated playing of simple compositions to learn the bass and treble musical systems. Numerous prior art systems and methods have attempted to improve on the teaching of music but generally fail to provide an interactive system and method that effectively works with beginners, particularly children. Other systems have attempted to develop teaching aids and graphical devices to aid in learning the notes of a scale but still have failed to associate the teaching methodology with the sounds of the musical notes and their proper location on a keyboard. Further, there has been no useful method for introducing and associating the proper musical intervals with their relationship to the treble and bass clefs and the keys of a keyboard instrument. Various prior art systems and methods described below have failed in creating the unique aspects of the present invention.

U.S. Pat. No. 1,741,769 issued Dec. 31, 1929 to A. Y. Hall shows a mechanical piano instruction device whereby notes are scrolled above the keys on a piano in the time and rhythm of the music but that does not have the interactive qualities of the present invention to provide real time correction and authentication of the user's selection of particular keys that correspond to the proper notes played.

U.S. Pat. No. 4,819,539 issued Apr. 11, 1989 to Searing shows a Music Teaching System and Apparatus using flash cards associated with notes on the treble and clef staffs but fails to show the inventive method of the present invention.

U.S. Pat. No. 1,758,043 issued May 13, 1930 to H. D. Hoffmeister shows a static device for correlating the staff with the keyboard of a piano but does not have the interactive qualities of the present invention.

U.S. Pat. No. 1,833,204 issued Nov. 24, 1931 to E. L. Buxton shows a static keyboard and staff reader that does not have the interactive qualities of the present invention.

U.S. Pat. No. 3,577,890 issued May 11, 1971 to E. F. Walker et al. shows a musical teaching aid that corresponds the notes of the treble and bass clefs with the keys of the piano, but does not have the interactive quality of the present invention.

U.S. Pat. No. 4,056,999 issued Nov. 8, 1977 to W. J. Bennett shows a piano teaching aid that comprises an overlay that fits over the keys of the piano to show the association between the notes and the treble and clef staffs but does not have the interactive quality of the present invention.

U.S. Pat. No. 1,400,947 issued Dec. 20, 1921 to E. Fennell shows an indicator for musical instruction that associates the notes on the staffs with the notes on the keyboard and provides an audible buzzer when the correct association is made but does not provide real time association with proper note and rhythm by audio and visual means to signify correct and incorrect choices while playing a piece of music.

U.S. Pat. No. 1,766,087 issued Jun. 24, 1930 to N. L. Sullivan to a music chart blackboard shows a depiction of a keyboard over the lines for the treble and bass staffs for instructing students on notes but does not show the interactive qualities of the present invention.

U.S. Pat. No. 1,768,706 issued Jul. 1, 1930 to E. Miller shows a static key board and staff reader that associates the notes of the staffs with the keys of the piano but lacks the interactive qualities of the present invention.

U.S. Pat. No. 3,570,360 issued Mar. 16, 1971 to H. J. Siegel shows a music teaching device whereby a simulated keyboard is presented and a horizontal presentation of music is shown and the user uses a stylus to indicate the proper note shown on the musical representation and in so doing produces an audible sound corresponding to the proper note, but does not show an interactive method or system like the present invention for teaching a musical composition and the proper timing orientation of the notes in a real time setting.

U.S. Pat. No. 3,728,930 issued Apr. 24, 1973 to W. Maron shows a Music Training Device that presents notes on the treble and bass staffs through a window showing one note from each in time but is not interactive or automatic and does not have the qualities of the present invention.

U.S. Pat. No. 3,822,630 issued Jul. 9, 1974 to V. M. Leonard shows a static music teaching aid based on the hands and scale degrees but does not have the interactive qualities of the present invention.

U.S. Pat. No. 3,903,781 issued Sep. 9, 1975 to V. M. Leonard shows a static keyboard progression teaching aid for associating notes to the keys of a key but fails to show the inventive interactive system of the present invention.

U.S. Pat. No. 4,295,407 issued Oct. 20, 1981 to V. M. Leonard shows a static keyboard simulation with vertical inversion indexes and insert cards but fails to show the interactive qualities of the present invention.

U.S. Pat. No. 5,524,522 issued Jun. 11, 1996 to J. Hesnan shows a sliding template with view windows that show musical notes and a version that displays the information on a hand held calculator but fails to show the interactive qualities of the present invention.

U.S. Pat. No. 6,031,172 issued Feb. 29, 2000 to M. G. Papadapoulos shows a static set of reference rings that show musical notes and their relationship to scales and keys but fails to show the interactive qualities of the present invention.

U.S. Pat. No. 5,639,977 issued Jun. 17, 1997 to Hesnan shows a sliding template with view windows that show musical notes and a version that displays the information on a hand held calculator but fails to show the interactive qualities of the present invention.

U.S. Pat. No. 5,496,179 issued Mar. 5, 1996 to Hoffman shows a music teaching system using depictions that correspond with the alphabetic names of musical notes but fails to show the interactive qualities of the present invention or an association with the aural sound of the notes.

U.S. Pat. No. 5,886,273 issued Mar. 23, 1999 to Haruyama shows a performance instructing apparatus having a display and keyboard showing vertically oriented notes but fails to show proper location on a musical staff or have the interactive qualities of the present invention.

U.S. Pat. No. 6,388,181 issued May 14, 2002 to Moe shows a computer graphic animation of a keyboard and the proper location of the hands on the keys but fails to show proper location on a musical staff or the interactive qualities of the present invention.

U.S. Patent Application Publication No. US 2002/0177113 A1 published Nov. 28, 2002 to Sherlock shows a method and apparatus for learning to play musical instruments but fails to show proper location of the notes on a vertical musical staff or the interactive qualities of the present invention.

The prior art does not show a fully automated and interactive teaching system that utilizes real time presentation of music on a display medium such as a computer screen and that provides ongoing correction and affirmation of a student's choice of key depression that corresponds with the musical piece being learned. Further, none of the prior art shows a variety of games that stimulate musical learning by using the interactive qualities of a computer and its association with responsive video and audio signals to represent proper and incorrect association of notes with the keys of an instrument interconnected to the computer system. No prior art system provides a teaching system that presents music in interactive shapes and colors, shows the music in a vertical orientation to the keyboard and associates they musical staffs with the keys of a piano. Nor does any prior art system make use of the aural association between the sounds of the notes and their proper location on the keyboard or musical staffs. Further, no prior art system has used color coded graphics for the lines and spaces of the staffs and notes in a coordinated method for teaching beginners to recognize the proper notes and their location on the musical staff.

BRIEF SUMMARY OF THE INVENTION

The primary object of the invention is to provide a simple method for teaching music to children.

Another object of the invention is to provide an automated teaching method using a computer.

Another object of the invention is to provide an automated teaching method that incrementally introduces traditional piano music.

A further object of the invention is to provide a teaching system that presents music in interactive shapes and colors.

Yet another object of the invention is to provide a teaching method that presents music in a vertical orientation.

Still yet another object of the invention is to provide a teaching system that presents piano music in a vertical orientation in line with the piano keys.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is shown a system for teaching music having a visual display of at least one vertically oriented music staff having at least one staff line where the staff is oriented with higher pitched notes positioned to the right, representation of notes of music on the visual display in positions on the staff; and visual feedback information on the visual display that correctly describes staff position of music tones corresponding to a plurality of depressed keys on a keyboard.

In accordance with another preferred embodiment of the invention, there is shown a system for teaching music having a representation of at least one music staff through a visual display having at least one staff line, scrolled musical representations through a visual display means whereby images of notes along the staff lines move with relatively constant speed, a visual representation of a position point along the staff that designates a time bar, and presentation of selected musical representations along the time bar corresponding to the notes that are to be played.

In accordance with another preferred embodiment of the invention, there is shown a method for teaching music having the steps of presenting a plurality of pictures to a user through a visual display interconnected to a computing device, designating for each of the pictures a pre-determined word, whereby each word is phonetically associated with a sol-fa note name, and associating the pictures with the note name.

In accordance with another preferred embodiment of the invention, there is shown a process for teaching music having the steps of presenting a user a graphical representation of lines and spaces from a musical staff on a visual display, visually presenting the lines and spaces in generally equal width, thereby associating the lines and spaces with the proper musical intervals of a musical scale through an interconnection between a computing device and the display, and presenting musical representations along the lines and spaces and selectively providing visual output in response to user input corresponding to choices made by the user.

In accordance with another preferred embodiment of the invention, there is shown a process of teaching music having the steps of presenting two musical staffs, having lines and spaces, on a visual display through a computing device, designating for each musical staff a different visual presentation for the lines of that particular staff, and providing a graphical association on a keyboard to the lines using the same visual presentation for each respective staff, wherein the keyboard is interconnected to the visual display through a computing device.

In accordance with another preferred embodiment of the invention, there is shown a process of teaching music having the steps of presenting a musical staff, having lines and spaces, on a visual display, designating a different visual presentation for the notes that fall on the lines from the visual presentation for the notes that fall on the spaces of the staff.

In accordance with another preferred embodiment of the invention, there is shown a method for teaching music having the steps of presenting a user through a visual display a pre-determined series of musical representations, permitting user input corresponding to the playing of a sequence of musical notes in response to the representations, presenting the user on a visual display with the representations on a vertically oriented staff, and changing the display to a horizontal musical staff showing the same musical representations.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 4 is showing an enhanced musical representation with colored staff lines positioned vertically, the width of each staff line is equal to the space between staff lines. The musical notes are presented as colored circles with sol-fa pictographs.

FIG. 5 is showing the same musical representation as in FIG. 4 except that the staff lines are positioned horizontally.

FIG. 6 is showing the same musical representation as in FIG. 5 except that the musical notes do not include sol-fa pictographs.

FIG. 7 is showing the musical score with the standard thin black staff lines positioned horizontally. The musical notes are presented using the standard musical notation.

DETAILED DESCRIPTION OF THE PREFERRED EMBODIMENTS

Figure 1:
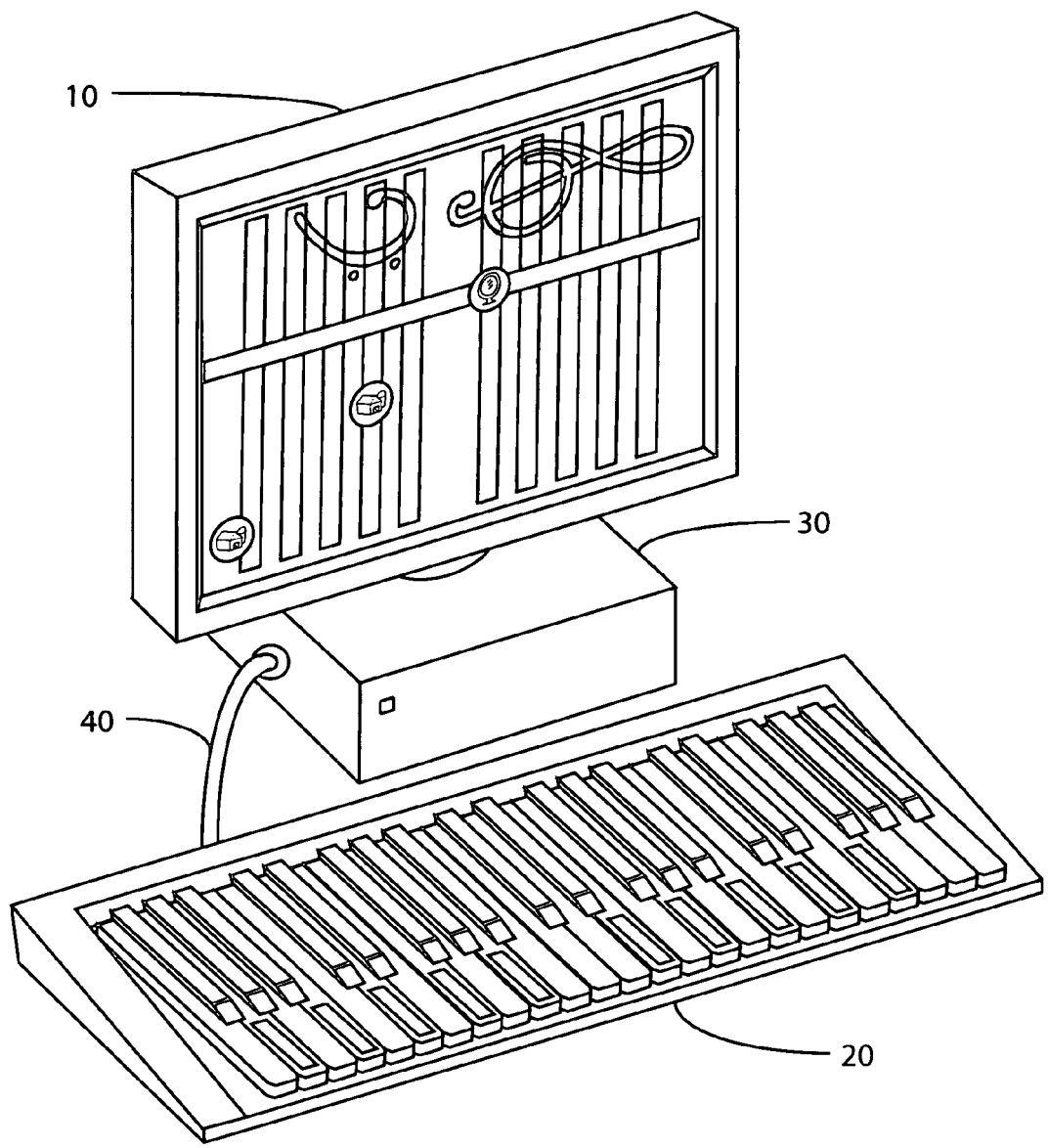
FIG. 1 is a view showing a computer with a computer monitor and an electronic piano keyboard connected to the computer.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The innovative part of this invention lies in the modified representation of music staff and notes adapted for beginners and children, and visual association of music staff with the piano keyboard. The system helps train the skills that have often been overlooked by other music-teaching methods.

Other methods have neglected the simple fact that all notes on the music staff are basically represented as space or line notes. The present invention contains various methods and systems that drill the student to quickly recognize the difference between space and line notes.

A common difficulty for beginners during site reading is determining note line number. The present invention offers training for a quick identification of all staff lines and spaces.

Other methods do not address the important fact that, while playing music, a musician reads notes both forward and back. In contrast, the inventive system presented herein provides several exercises to help students develop this crucial skill. With this invention, students learn to expertly and effortlessly read the music notes in any order.

The inventive system preferably uses Do, Re, Mi, Fa, Sol, La and Ti note names instead of A, B, C, D, E, F and G, especially for small children and beginners. Physiologists proved that not only our ears, but our throat, too, participate in the process of music perception. Whenever we hear or play a melody we also sing along with it inside of our mind. The Solfeggio (Do, Re, Mi . . . ) note name system is accepted worldwide for vocalization. The use of the less convenient method of singing alphabet syllables (A, B, C . . . ) cuts the link between the sound of music and our perception of it. However, the system of the present invention will allow all exercises and games to be switched to the A-B-C notation, if the student so desires. The representation of notes that phonetically associate with note names helps not only to distinguish notes, but to also memorize their names and sing them while playing.

The method introduces revolutionary representation of the music score that allows any beginner, a child or an adult, to read and play songs from the very first session and, thus, to avoid months of abstract memorizing.

The method is built upon the notion that the art of piano performance as a set of essential simple skills united by practice. The method helps students to develop and master these skills using an entertaining and relaxed way.

In order to provide a student with effective music practicing preferred embodiments are implemented in the form of interactive video games appealing to adults and toddlers as well. That provides an opportunity for productive training in music classes or at home.

This method operates on a "no boring lecture" approach and needs no theoretical introduction. Software applications use very simple intuitive user interface and demand no reading skills from the player. Each of the following methods and systems may be implemented in software and hardware well know the those of skill in the art and may take many forms including desktop computers and attached electronic keyboards, musical teaching toys, dedicated keyboards with an onboard computer and the like. Some of the methods and systems may be implemented in a variety of mechanical or electrical configurations well known in the art.

Figure 2:
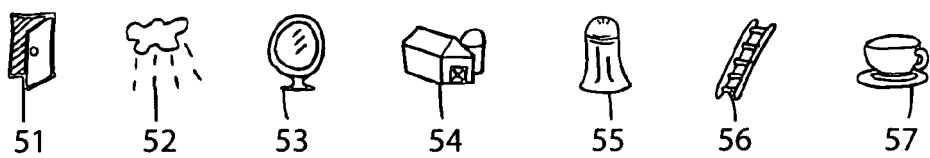
FIG. 2 is showing pictographs representing sol-fa names of musical notes.

FIG. 2 shows a set of pictographs 51-57 used in the current invention to represent the sal-fa syllables (Do, Re, Mi, Pa, Sol, La and Ti) traditionally utilized as the names for musical tones and musical notes. Each pictograph depicts an object, wherein a name of said object when pronounced, phonetically resembles one of the sal-fa syllables. In the preferred embodiment, Do is represented by a picture of a door 51, Re by a picture of a rain cloud 52, Mi by a picture of a mirror 53, Fa by a picture of a farm 54, Sol by a picture of a salt shaker 55. La by a picture of a ladder 56, and Ti by a picture of a teacup 57. Beginners can easily associate any of these pictographs with a sol-fa syllable by pronouncing the name of the object it depicts. The pronunciation of the object name helps to recall and pronounce the name of a musical note represented by said pictograph. In the present invention, these pictographs are used for indicating musical notes on the musical score, and for labeling piano keys. The choice of objects and the corresponding words for pictographs is not restricted to the set used in the preferred embodiment it is possible to use any set of objects and words which are easily understood and memorized by children, where the words are easily associated with the objects and phonetically close to the sol-fa syllables. The advantages of using such pictographs include the following:

a) the possibility of teaching children how to read and sing musical notes before they know letters; and b) the recognition of pictographs is faster than the reading of written syllables.

FIG. 1 is showing a general view on the preferred embodiment of the present invention. It contains a display unit 10 connected to a computer 30, and an electronic piano keyboard or a digital piano 20 connected to computer 30 using a MIDI cable 40. In the preferred embodiment, display unit 10 is a computer monitor of LCD, CRT, LED or any other type. However the display unit may be any electronic, optical, or mechanical device able to display the needed visual information that will be discussed later. A computer program running on computer 30 controls the visual information presented by display unit 10 using means well known in the art. Display unit 10 and computer 30 with the running computer program compose the music display means for displaying elements of the musical score.

In the current invention, piano keyboard 20 serves as the musical device for generating musical tones. Instead of the piano keyboard, it is possible to use any musical device capable of producing musical pitch information which can be transferred to the computer. In the preferred embodiment, to transfer the musical pitch information from piano keyboard 20 to computer 30, we use the MIDI (Musical Instrument Digital Interface) connection well known in the art. Piano keyboard 20 generates MIDI signals on every pressure on and release of the piano keys. These MIDI signals are then transferred to computer 30 using MIDI cable 40, and are analyzed by a computer program running on the computer. However, the present invention can use any type of connection capable of transferring the musical pitch information from a musical device to a computer, including electric, radio, optical, or mechanical means. The MIDI connection and computer 30 with the running computer program compose the visual feedback means. The said visual feedback means transfer the pitch information from piano keyboard 20 to computer 30, and present the visual information on display unit 10, this visual information describing the piano keys played on piano keyboard 20 or the musical a tone information entered through a musical device.

Figure 3:
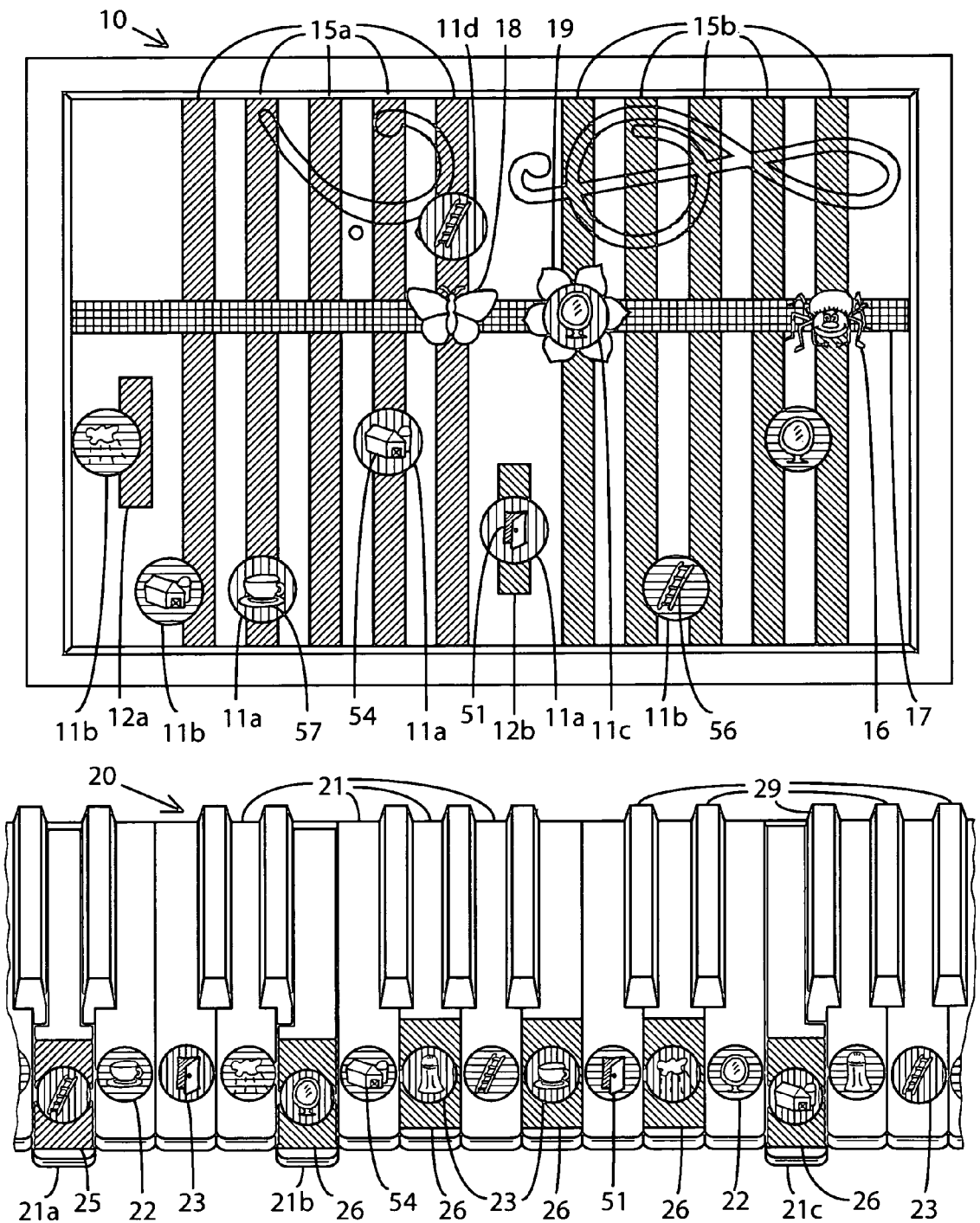
FIG. 3 is a view showing a part of the electronic piano keyboard with attached labels, and the computer monitor displaying transformed representation of a musical score together with the visual feedback information that describes the played piano keys.

FIG. 3 shows a closer view of piano keyboard 20 and display unit 10 from FIG. 1. An important part of the present invention is the visual appearance of the musical score on the display unit. The current invention uses several presentations of the musical score transformed from the standard musical notation. FIG. 3 shows display unit 10 displaying a vertically transformed presentation of the musical score. Five vertical lines 15a represent the staff lines of the vertical Bass staff; and five vertical lines 15b represent the staff lines of the vertical Treble staff. The position of a visual object on the Bass or Treble staff describes the musical tone associated with said visual object. An object positioned further to the right describes higher musical tone. Short additional lines 12a and 12b represent ledger lines to pinpoint musical notes outside of the five main staff lines; ledger line 12a is for the Bass staff and ledger line 12b is for the Treble staff. A musical score can include any needed number of ledger lines for each musical staff. As seen on FIG. 3, the vertical staff lines displayed on display unit 10 can be visually associated with the piano keyboard even without directly superimposing the musical staff lines over the piano keys. With vertical staff lines, musical notes positioned to the right correspond to higher musical tone the same way as the piano keys positioned to the right produce higher pitch, so it's easier to find the correspondence between musical notes and piano keys. For piano beginners, this is an advantage over the standard notation, which uses horizontal staff lines and vertical positioning of musical notes.

In the resent preferable embodiment, Bass staff lines 15a together with Bass ledger lines 12a are brown-colored, and Treble staff lines 15b together with Treble ledger lines 12b are green-colored to visually distinguish the Treble staff from the Bass staff. However, the staff lines can have any color scheme or visual representation to distinguish the Bass staff lines from the Treble staff lines, including the difference in shading, hatching or shape of the staff lines. The presentation of different musical staves using contrasting colors helps to distinguish lines of different musical staves before beginners learn how to distinguish musical staves using staff clefs.

The width of staff lines is 15a and 15b is equal to the width of space between adjacent staff lines. For beginners, the use of the same width for staff lines and spaces has the following advantages over standard notation with thin staff lines:

a) it strengthens the visual association between staff lines and piano keys; and b) it helps to find the number of musical intervals between two notes and the number of piano keys between two piano keys corresponding to these notes.

On FIG. 3, display unit 10 displays circular visual objects 11a and 11b positioned on the musical staves to represent musical notes. In the preferred embodiment, all the notes positioned on the staff lines or ledger lines are colored red and numbered as 11a. All the notes between staff lines are colored blue and numbered as 11b. However, the visual objects representing musical notes can have any color scheme or visual representation that distinguishes musical notes an the staff lines from the musical notes positioned between staff lines, including the difference in color, shading hatching or shape of the musical notes. The use of two contrasting colors to present musical notes on or between musical staff lines helps to accentuate the position of a musical note on the musical staff, visually distinguish closely positioned musical notes, and determine the musical interval between any of two musical notes by comparing their colors. Musical notes 11a and 11b can contain symbols that represent the names of musical notes. In the preferred embodiment, these symbols are pictographs 51-57 from FIG. 2 representing the sol-fa syllables Do, Re, Mi, Fe, Sol, La and Ti. In another embodiment, the symbols are the letters C, D, B, F, G, A and B, which are the alphabetical note names. As discussed above, the choice of pictographs is not restricted to pictographs 51-57. The symbols representing musical note names help beginners to determine musical note names and match them with correct musical instrumentalities.

Display unit 10 displays a timing bar 17, a horizontal line on a predefined point along musical staff lines. The musical notes positioned on liming bar 17 represent the musical tones that have to be played in the present moment of time. One such note is shown on FIG. 3 as 11c. Outside of timing bar 17, all musical notes move with generally constant speed in one direction along the staff lines, creating a scroll of the musical piece. Before achieving timing bar 17, musical notes 11a and 11b move upwards from the bottom of screen, allowing the player to see what notes are coming up in the musical piece, and then to play those notes accordingly. When a note reaches timing bar 17, the player is required to play this note by pressing a correct piano key, and continue pressing it until the note leaves the timing bar. To show an exact moment of reaching timing bar 17, the note changes its color shade, and a colored halo appears round the note. The proper duration of the note is controlled by the computer program. After musical notes are played, they leave timing bar 17 to continue their scroll motion upwards and disappear. Such note is shown on FIG. 3 as 11d. If not all notes on the timing bar are played, or some wrong piano keys are pressed, the scroll of the musical piece is stopped until all and only the needed piano keys are played.

Visual objects 16, 18 and 19 represent the visual feedback information about the played piano keys. A spider image 16 indicates the tone of a wrongly pressed piano key 21c, a key that doesn't correspond with any of the notes required for playing in the current time. An image of a blossoming flower bud 19 around the image of the currently played musical note 11c indicates a correctly pressed piano key 21b. The flow of time for a currently played note is represented by the opening of the flower petals. In another embodiment, a colored halo around the musical note shows that the note is correctly played. An image of a butterfly 18 represents the tone of a piano key 21*a* that was correctly pressed but has not been released after the note was completely played.

The visual feedback provides the player with a visual response about the correctness of his or her actions. Also, such feedback shows the staff position of the musical tones corresponding to the played piano keys, helping to associate the space of piano keyboard with the musical staves and facilitate the playing of subsequent musical notes. The visual feedback may also include the change of color or shape of existing elements of the musical presentation, e.g. the musical notes and staff lines. In the preferred embodiment visual feedback objects 16, 18 and 19 are positioned on timing bar 17. Presenting all the important information on timing bar 17 allows the beginner to focus 2 her attention on the timing bar region instead of the whole field of musical score. It simplifies musical reading while still preserving all the major features of musical notation. The scroll of the musical score allows the player to predict the next musical notes to play.

FIG. 3 shows piano keyboard 20 with white keys 21 and black keys 29, piano keys 21; 21*b* and 21*c* are in the played position. The present invention uses the visual marking of piano keys of piano keyboard 20 or control instrumentalities of another musical device that are used by a player to produce musical tones. Such control instrumentalities may be ban of a xylophone or marimba, a fret board of string instruments, or valves or apertures of a wind instrument. In the preferred embodiment, these markings are implemented as paper stickers applied on the piano keys. However, these markings may be made using any suitable means and materials such as paper or plastic labels applied on or behind piano keys, paint, or light sources such as electric lamps.

The piano keys that correspond to the musical notes on the five Bass staff lines 12*a* and five Treble staff lines 15*b* have markings to associate them with the lines of musical staves. In the preferred embodiment these markings are implemented as stickers 25 and 26 applied on the piano keys. Preferably, the color of stickers matches the color of the corresponding staff lines on the display unit. The stickers 21 corresponding to the Bass staff lines 15*a* are brown, and the stickers 26 corresponding to the Treble staff lines 15*b* are green. However, the difference in the visual marking of piano keys that correspond to the Bass staff compared to the Treble staff can include a difference in color scheme, shading, hatching or bitmap filling. Marking the piano keys that correspond to the musical staff lines helps beginners to associate the space of a piano keyboard with the musical score. Matching the marked piano keys with staff lines allows the student to easily find a correct piano key for any note on the musical staff.

The piano keys that correspond to the musical notes on the staff lines 15*a* and 15*b* or ledger lines 12*a* and 12*b* are marked with red labels 23. The piano keys that correspond to the musical notes between staff lines or ledger lines are marked with blue labels 22. In the preferred embodiment, this color scheme corresponds with the color scheme of musical notes 11*a* and 11*b* on display unit 10. However, the visual difference between labels 22 and 23 can include any difference in color, shading, hatching or bitmap filling of the labels. These color markings add the visual correspondence of the piano keys with the musical notes on the musical staff.

In the preferred embodiment, the piano keys have labels with pictographs 51-57 shown on FIG. 2, each pictograph representing one of the eel-N names Do, Re, Mi, Fa, Sol, La and Ti of musical tones, and each key having a pictograph corresponding to the tone produced by this piano key. In another embodiment, instead of pictographs 51-57, the labels can represent the letters of alphabetical musical Dote names C, D, E, F, G, A and B. The labeling of the piano keys with the pictographs has following advantages;

a) Marking piano keys with sol-fa pictographs or letters allows piano beginners to easily find any piano key by its note name;

b) Using the same symbols for the musical notes on the musical score allows beginners to match musical notes with piano keys and to start reading music and playing the piano from the first piano lesson; and c) Sol-fa pictographs help a player to practice Solfeggio by singing the musical names while playing the piano.

FIGS. 4 through 7 shows a sequence of different representations of the same musical score. Though simplified and visually enhanced, these representations retain the most important features of the standard musical scow, including the use of the musical staff lines for indicating the musical note tones. Transformed musical representations allow the student to focus on the most important features of the musical score. All the visual enhancements support musical reading and help to acquire the skills to read musical notes on the musical staves. Starting from the most transformed from the standard musical representation on FIG. 4, and using intermediate representations shown on FIG. 5 and FIG. 6, the current invention gradually teaches students how to read the standard representation of musical staves and notes on FIG. 7.

Figure 4:
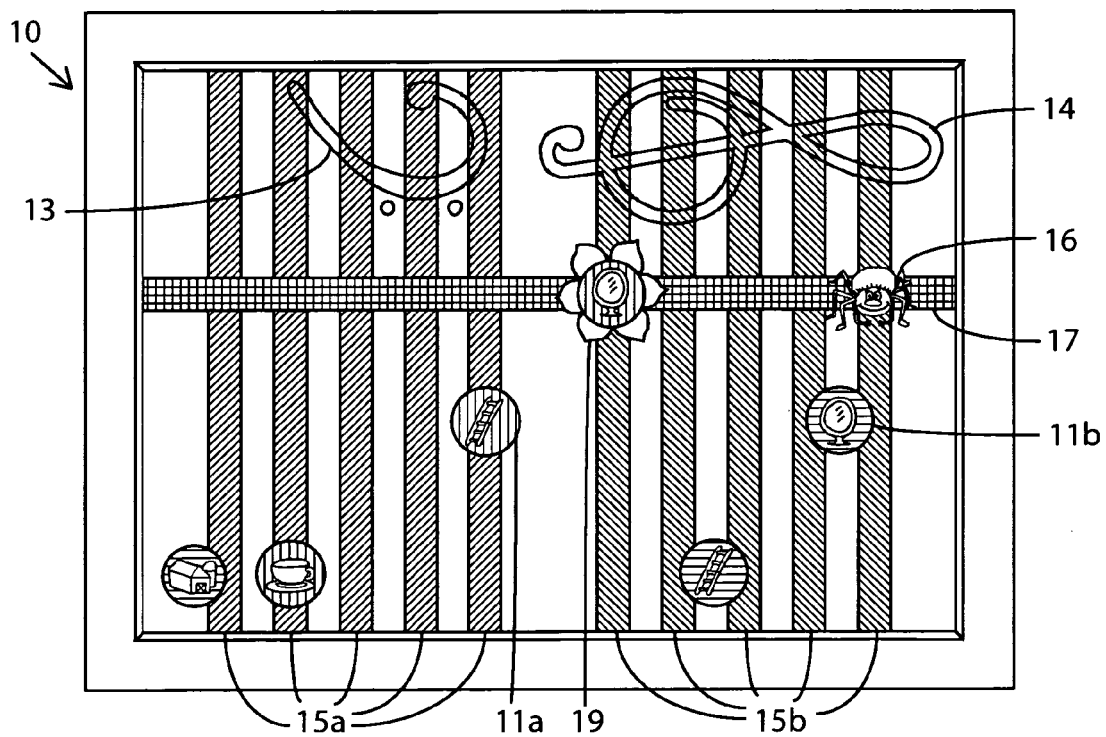
FIGS. 4 through 7 are showing a view on the computer monitor displaying the same musical score with different levels of transformation and enhancement from the standard musical notation.

FIG. 4 shows display unit 10 displaying the first musical representation, the same as shown in FIG. 3. The main features of this representation includes the following:

a) bass staff lines 15*a* and Treble staff lines 15*b* are positioned vertically b) the width of the lines is the same as the width of space between the lines;

c) the coloring of Bass staff lines 15*a* and Treble staff lines 15*b* in different colon helps to differentiate musical staves;

d) the musical notes are represented as colored circles of different colors for the notes on the musical staff lines and for the notes between musical staff lines;

e) an image of a note contains a pictograph or letter indicating its name;

f) the notes removing upwards along staff lines, creating a scroll of the musical piece before achieving timing bar 17.

g) at any moment in time, the notes on timing bar 17 represent the musical tones the player have to enter through a musical device, and the computer program controls how long a note stays on timing bar 17 depending on the length of the note; and h) The most important feedback information such as information about correctly pressed piano key 19 and wrongly pressed piano key 16 is shown on timing bar 17.

The musical staff lines, displaying vertically with the same width as spaces between them, can be easily associated with the piano keys. The feedback information strengthens this association. The symbols indicating note names allow students to easily determine and pronounce their names. Together with the musical staff lines, these symbols help to match the musical notes with correct piano instrumentalities. All the visual information needed for playing the musical piece is positioned on timing bar 17, so players can focuses only on the timing bar instead on whole space of the musical score. Scroll of the musical notes allows to predict next notes to play, teaching how to expand focus of attention.

Figure 5:
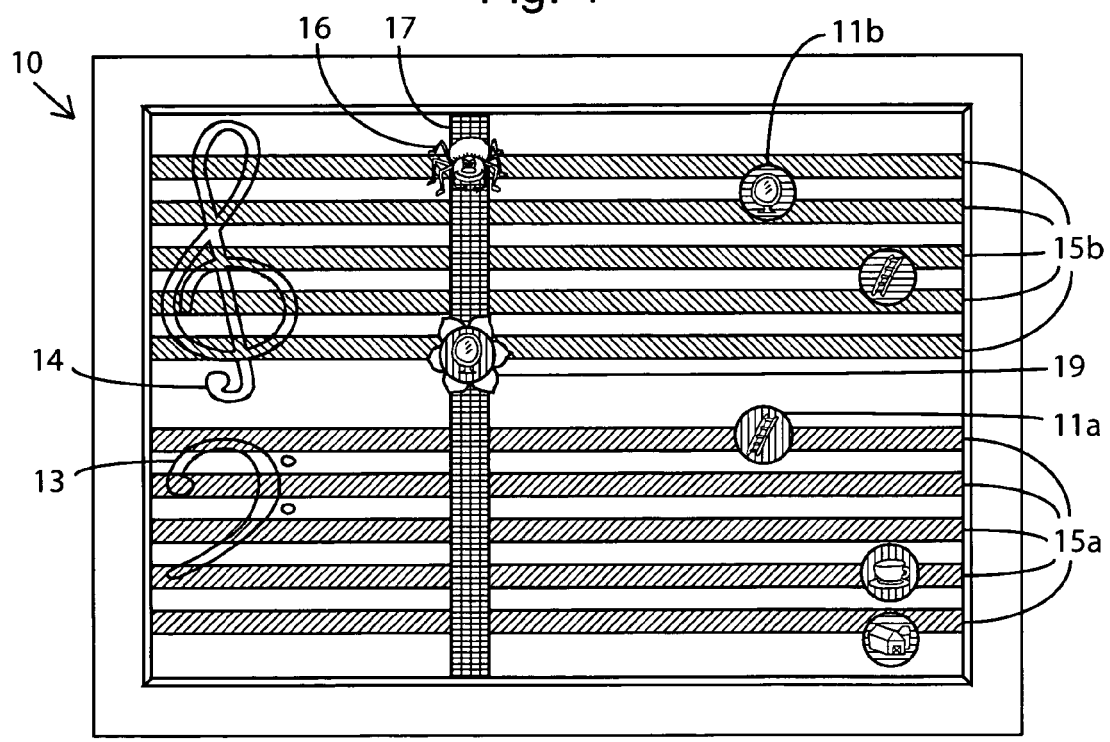

FIG. 5 shows the second musical representation that uses the standard horizontal position of the musical staves 15*a* and 15*b*, retaining all other enhancements of the first representation on FIG. 4. In this representation, the musical notes move from right to left, and timing bar 17 is represented as a vertical line. This representation uses the same width of the staff lines as the spaces between staff lines, different colors for the Bass staff lines 15a and the Treble staff lines 15b, different colors for line and space musical notes, symbols of musical note names in the image of each note, and visual feedback information on timing bar 17.

Figure 6:
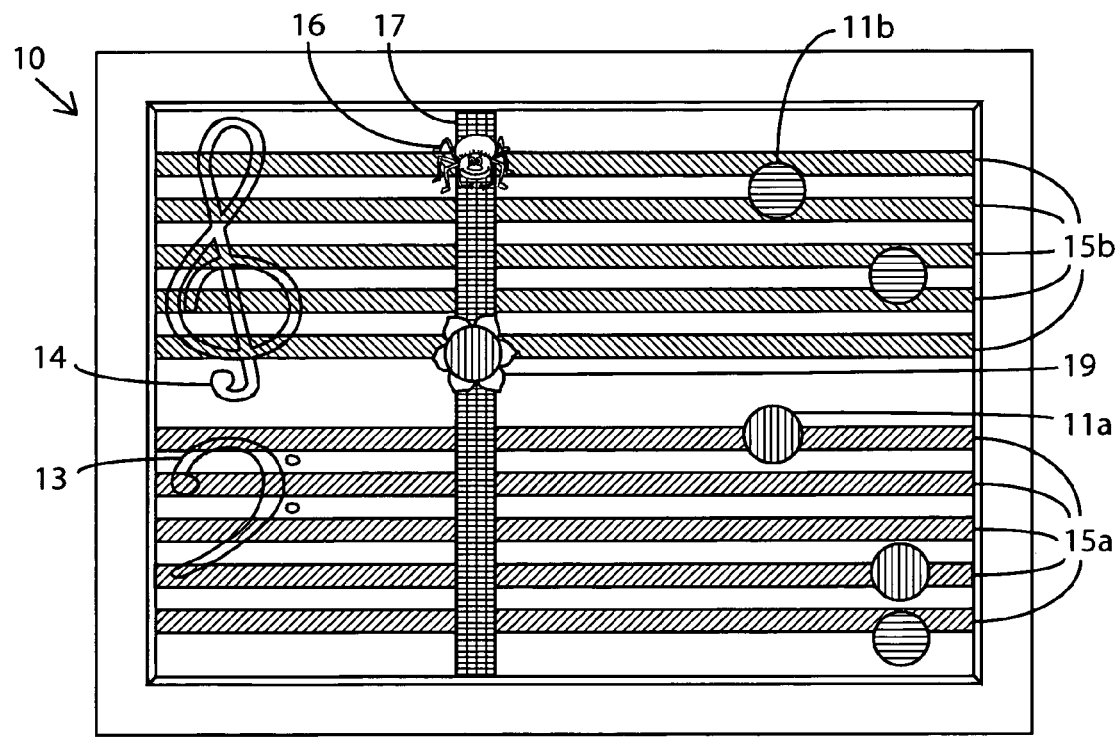

FIG. 6 shows the third musical representation. The difference between the third representation and the second representation lies in the removal of the symbols of musical note names from the image of notes. In this way, the students have to rely only on the position of the note on the musical staff.

Figure 7:
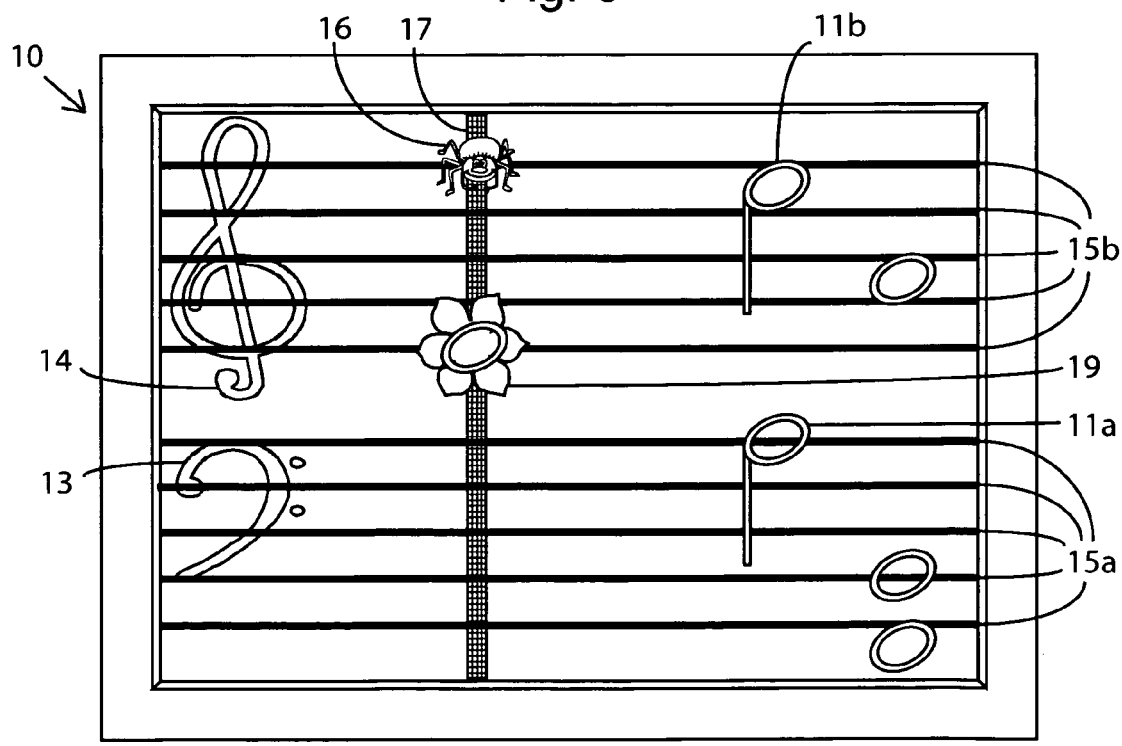
Figure 8:
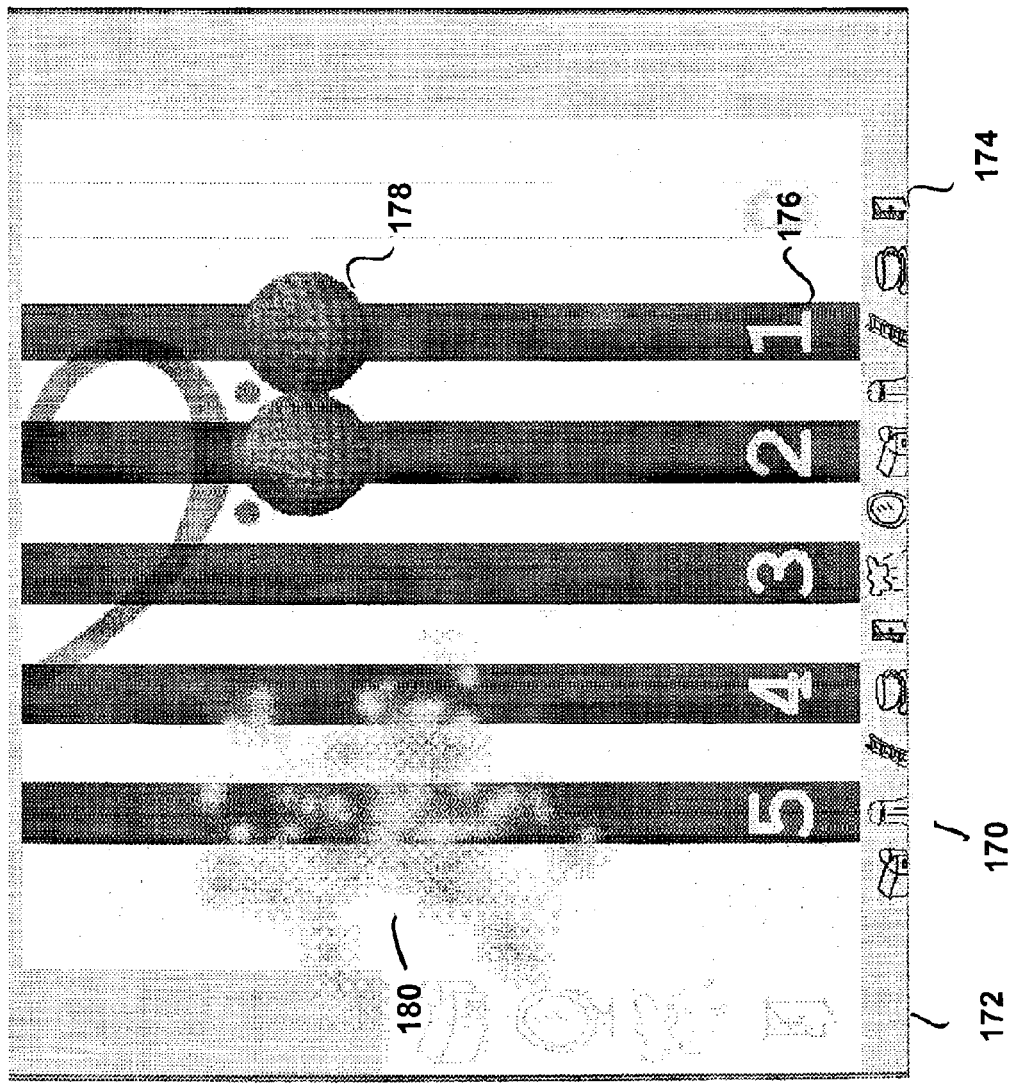
Figure 9:
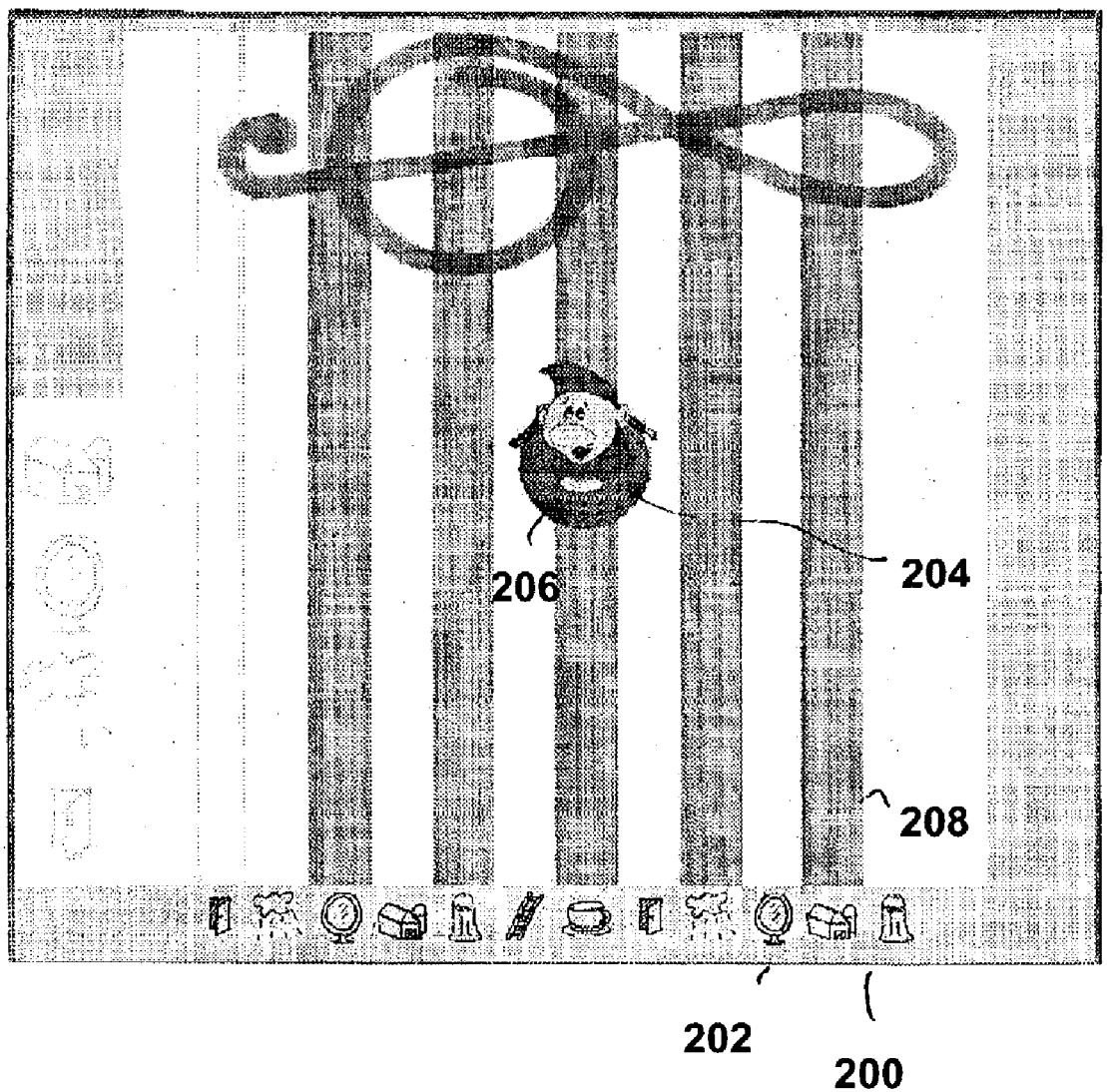
Figure 10:
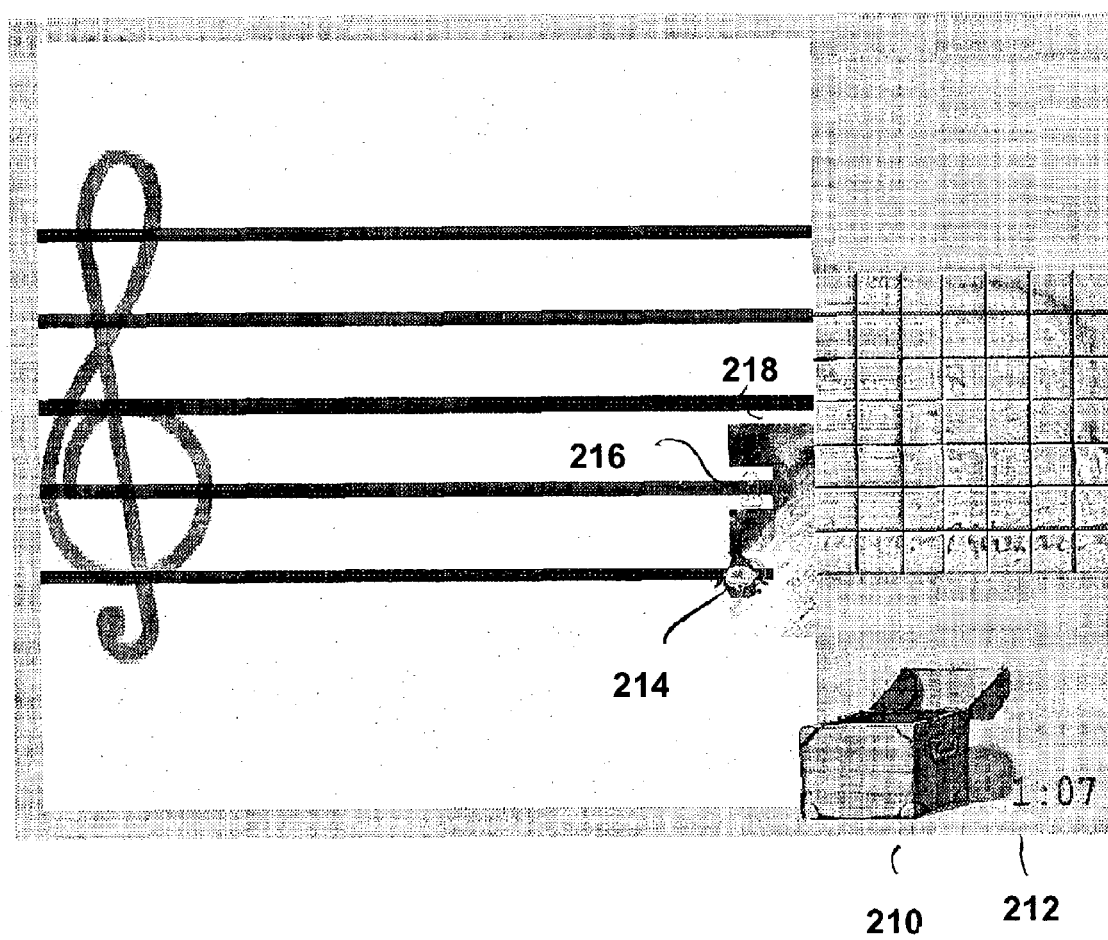
Figure 11:
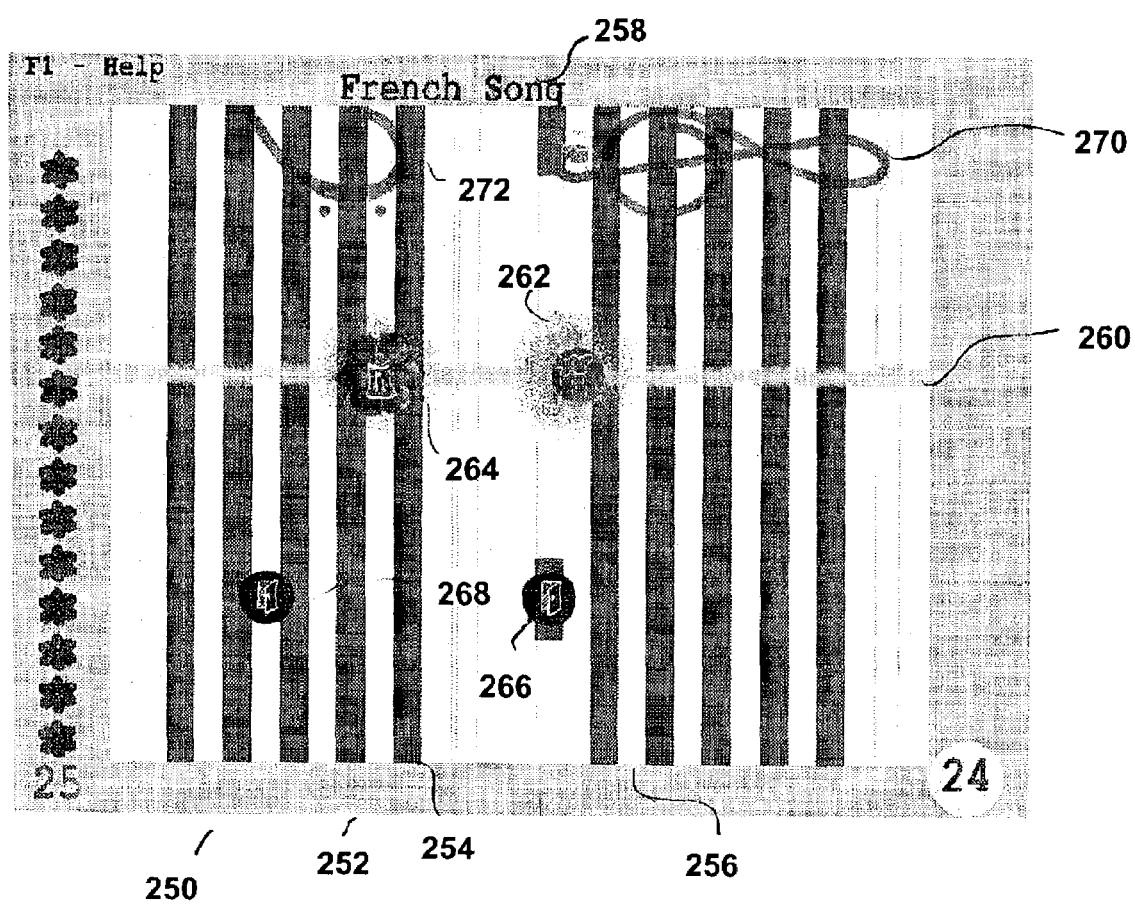
Figure 13:
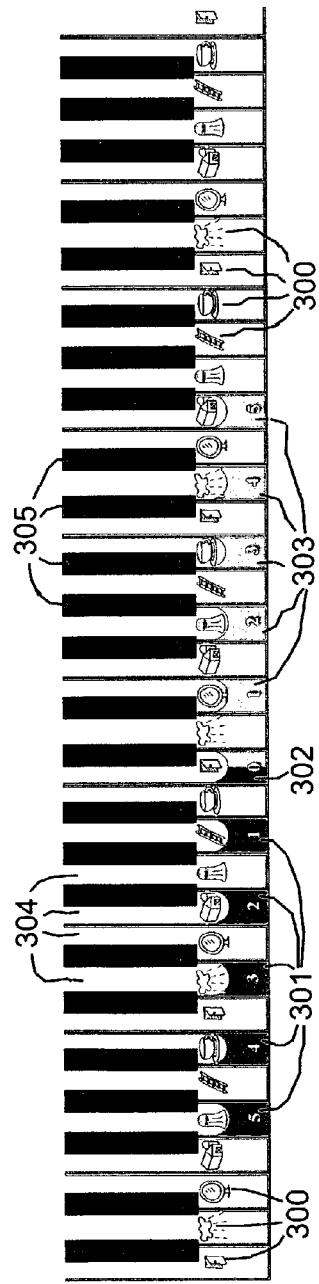
Figure 14:
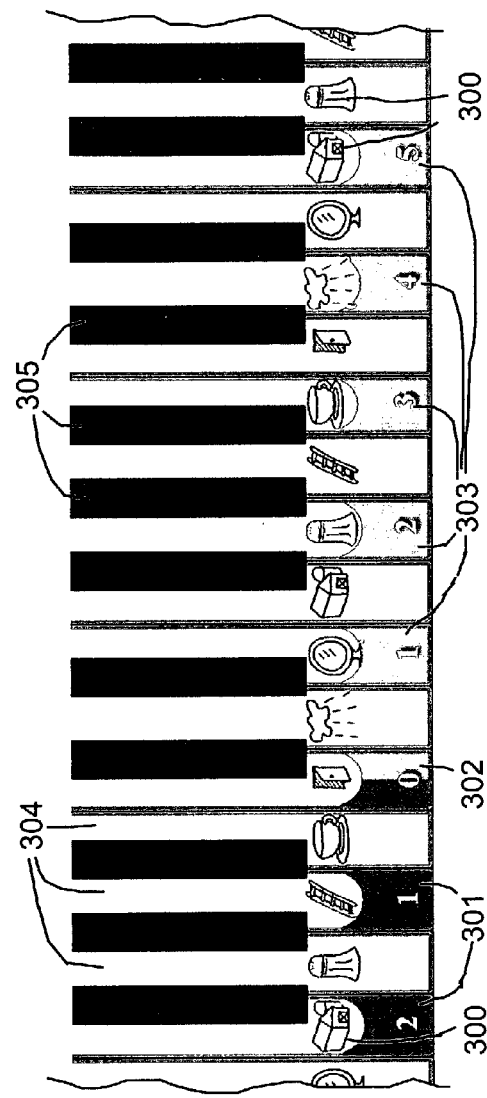

FIG. 7 shows the fourth musical representation having the standard horizontal black and thin staff lines, and the standard images of musical notes. In this representation, only the Bass clef 13 and Treble clef 14 identify the Bass and Treble Staves. In one embodiment, the musical notes move along staff lines, and timing bar 17 indicates all the notes that must be played. In another embodiment, the musical notes are not moving, and the next notes to play are indicated by a colored halo around those notes. Still, the feedback information 16 and 19 may show the position of the tones of played piano keys.

The system permits a user to play with right hand only while the left hand part plays automatically or the other way around. The student thereby is able to practice and memorize each hand of the musical piece separately. The system also allows for all note representations to be turned off to test a student's ability to play the piece from memory. Incorrect key selection causes the system to display the proper note for the student to play.

As is readily apparent to one of ordinary skill in the art, any of the foregoing games and methods described above may utilize vertical and horizontal depictions, colorful and black and white depictions, and thick and thin staff lines as desired to reinforce the association between written music and the input device such as a keyboard.

Although the description of the preferred embodiments above contains many specialties, these should not be construed as limiting the scope of the invention but as merely providing illustrations of some of the presently preferred embodiments of this invention. Many other variations are possible. For example, the display unit and computer may be a built-in part of a digital piano, the computer program may be hard-coded into an electronic device, the connection between the musical device and display unit may use sound or WiFi communication, the display unit can project the image on a screen or be an electro-mechanical representation of a musical score, and the marking of the piano keys may by the image projection from a light source.

Accordingly, the scope of the invention should be determined not by the embodiments illustrated, but by the appended claims and their legal equivalents.

What is claimed is:

1. A device for use in either playing or learning music comprising:
   a) means for displaying at least one vertically oriented line representing at least one vertically oriented musical staff or a portion of a vertically oriented musical staff and one or more visual objects representing musical notes to be played on a musical device positioned on or between one or more of said vertically oriented lines, the position of said visual object on said vertically oriented line denoting the musical tone of said musical note to be played; and
   b) means for displaying visual feedback information on said musical staff at a position denoting at least one musical tone corresponding to pitch information produced by the musical device when the musical device is played for comparison to the position of the visual object on said musical staff.

2. The device of claim 1 wherein said music display means and said visual feedback display means include a computer and a computer program running on said computer.

3. The device of claim 1 wherein said vertically oriented lines displayed by said display means comprising said musical staff are displayed as a plurality of staff lines having spaces therebetween, the width of each of said vertically oriented lines comprising said musical staff being approximately equal to the width of each of the spaces between said vertically oriented lines comprising said musical staff.

4. The device of claim 1 wherein said vertically oriented lines displayed by said display means comprise at least two said musical staves, the first of said musical staves comprising at least one vertically oriented line of a first color and the second of said musical staves comprising at least one vertically oriented line of a second color, the color of the lines comprising the first of said musical staves being different than the color of the lines comprising the second of said musical staves.

5. The device of claim 4 further including means for marking a control instrumentality of the musical device wherein a first marking is used for the control instrumentality which produces a musical tone that corresponds to a musical note on a staff line of the first of said musical staves and a second marking is used for the control instrumentality which produces a musical tone that corresponds to a musical note on a staff line of the second of said musical staves, the first marking being different than the second marking.

6. The device of claim 5 wherein said control instrumentality is a key of a musical keyboard, said first and second markings comprising a colored label for application to said key, the color of the label applied to a key producing a tone that corresponds to a musical note on the staff line on the first of said musical staves being different than the color of the label applied to a key producing a tone that corresponds to a musical note on the staff line on the second of said musical staves.

7. The device of claim 1 wherein said music display means further comprises means for:
   a) displaying a time bar region at a predetermined point along said musical staff;
   b) moving a musical note along said musical staff; and
   c) displaying said musical note on said time bar region, wherein the position of said musical note describes a musical tone to be played.

8. The device of claim 7 wherein said visual feedback object that denotes the musical tone played on said musical instrument is positioned on said time bar region.

* * * * *